United States Patent
Ogura et al.

(10) Patent No.: US 11,504,917 B2
(45) Date of Patent: Nov. 22, 2022

(54) METHOD FOR APPLYING HIGH VISCOSITY MATERIAL ON EDGE SURFACES

(71) Applicants: TOYOTA JIDOSHA KABUSHIKI KAISHA, Toyota (JP); ATLAS COPCO KK, Tokyo (JP)

(72) Inventors: Shuhei Ogura, Nagakute (JP); Hiroki Sugino, Toyota (JP); Tomohiko Sekiguchi, Nagakute (JP); Shingo Adachi, Nisshin (JP); Koki Kuwabara, Toyota (JP)

(73) Assignees: TOYOTA JIDOSHA KABUSHIKI KAISHA, Toyota (JP); ATLAS COPCO KK, Tokyo (JP)

( * ) Notice: Subject to any disclaimer, the term of this patent is extended or adjusted under 35 U.S.C. 154(b) by 0 days.

(21) Appl. No.: 17/191,001

(22) Filed: Mar. 3, 2021

(65) Prior Publication Data
US 2021/0291462 A1    Sep. 23, 2021

(30) Foreign Application Priority Data

Mar. 19, 2020  (JP) .............................. JP2020-048850

(51) Int. Cl.
*B29C 65/52*        (2006.01)
*B29K 105/00*    (2006.01)
(Continued)

(52) U.S. Cl.
CPC ............ *B29C 65/525* (2013.01); *B05C 1/006* (2013.01); *B05C 5/0204* (2013.01); *B05C 9/04* (2013.01);
(Continued)

(58) Field of Classification Search
CPC .... B05C 1/02; B05C 1/26; B05C 5/10; B05C 1/006; B05C 5/0204; B05C 9/04; B29K 2105/0094; C09J 5/00
(Continued)

(56) References Cited

U.S. PATENT DOCUMENTS

| | | | | |
|---|---|---|---|---|
| 4,031,854 A | * | 6/1977 | Sprague, Jr. ............ | A43D 25/18 118/641 |
| 5,645,667 A | * | 7/1997 | Kusen ...................... | B05D 1/00 156/108 |
| 6,077,375 A | * | 6/2000 | Kwok ............... | A61F 13/15593 427/256 |
| 6,733,831 B2 | * | 5/2004 | Hayder .................. | B65H 57/14 427/256 |

(Continued)

FOREIGN PATENT DOCUMENTS

| | | |
|---|---|---|
| JP | 05-123630 A | 5/1993 |
| JP | 2001-058148 A | 3/2001 |
| JP | 2008-000668 A | 1/2008 |

*Primary Examiner* — Brian K Talbot
(74) *Attorney, Agent, or Firm* — Sughrue Mion, PLLC

(57) ABSTRACT

A high viscosity material is discharged in the form of a continuous thread from an application nozzle toward an end of a workpiece and a space S on the side of the workpiece so that the high viscosity material in the form of the thread adheres to a front surface of the workpiece and the high viscosity material discharged in the form of the thread into the space on the side of the workpiece pivots around an edge of the workpiece to a back surface of the workpiece and adheres to the back surface of the workpiece. The high viscosity material can thus be applied to both the front and back surfaces of the workpiece in one step of discharging the high viscosity material only from the front surface side of the workpiece.

5 Claims, 11 Drawing Sheets

(51) Int. Cl.
  *B05D 1/00* (2006.01)
  *B05D 5/10* (2006.01)
  *B05C 5/02* (2006.01)
  *B05C 1/00* (2006.01)
  *B05D 1/26* (2006.01)
  *C09J 5/00* (2006.01)
  *B05C 9/04* (2006.01)

(52) U.S. Cl.
  CPC ................. *B05D 1/00* (2013.01); *B05D 1/26* (2013.01); *B05D 5/10* (2013.01); *B29K 2105/0094* (2013.01); *C09J 5/00* (2013.01)

(58) Field of Classification Search
  USPC .......................... 427/208, 284, 421.1, 207.1
  See application file for complete search history.

(56) References Cited

U.S. PATENT DOCUMENTS

| | | | |
|---|---|---|---|
| 9,016,598 B2* | 4/2015 | Ikushima | B05C 5/0216 239/264 |
| 9,827,579 B2* | 11/2017 | Hidaka | B05B 7/0815 |
| 2003/0082309 A1 | 5/2003 | Hayder et al. | |
| 2003/0111162 A1* | 6/2003 | Erdman | B29C 66/83415 156/167 |
| 2004/0164180 A1* | 8/2004 | Harris | B05C 9/10 239/296 |
| 2011/0104365 A1* | 5/2011 | Hidaka | H01L 31/048 427/74 |
| 2018/0056646 A1* | 3/2018 | Inagaki | B41J 2/04505 |
| 2018/0147590 A1* | 5/2018 | Chen | B05C 5/0204 |
| 2019/0001367 A1* | 1/2019 | Liu | B05B 3/02 |

* cited by examiner

COMPARATIVE EXAMPLE

COMPARATIVE EXAMPLE

COMPARATIVE EXAMPLE

METHOD FOR APPLYING HIGH VISCOSITY MATERIAL ON EDGE SURFACES

CROSS-REFERENCE TO RELATED APPLICATION

This application claims priority to Japanese Patent Application No. 2020-048850 filed on Mar. 19, 2020, incorporated herein by reference in its entirety.

BACKGROUND

1. Technical Field

The disclosure relates to methods and apparatuses for applying a high viscosity material such as an adhesive to a workpiece.

2. Description of Related Art

Methods for applying an adhesive to both front and back surfaces of a workpiece include the following methods (i) to (iii).

(i) Method Disclosed in Japanese Unexamined Patent Application Publication No. 2008-000668 (JP 2008-000668 A)

As shown in FIG. 13, after an adhesive 3 is applied to a front surface 2a of a workpiece 2 using an application apparatus 1, the workpiece 2 is turned over and the adhesive 3 is applied to a back surface 2b of the workpiece 2 using the same application apparatus 1.

(ii) Method Shown in FIG. 14

The adhesive 3 is applied to the front and back surfaces 2a, 2b of the workpiece 2 in the same step using an application apparatus 1a for applying the adhesive 3 to the front surface 2a of the workpiece 2 and an application apparatus 1b for applying the adhesive 3 to the back surface 2b of the workpiece 2.

(iii) Method Shown in FIG. 15

After the adhesive 3 is applied to the front surface 2a of the workpiece 2 using an application apparatus 1c, the adhesive 3 is applied to the back surface 2b of the workpiece 2 using an application apparatus 1d in a subsequent step.

However, the above methods (i) to (iii) have the following problems.

Method (i)

Since it is necessary to turn over the workpiece 2, it is difficult to apply the adhesive to both sides of the workpiece 2 in one step.

Method (ii)

The plurality of application apparatuses 1a, 1b is required, which is disadvantageous in terms of cost.

Method (iii)

It takes two steps to apply the adhesive to the front surface 2a and the back surface 2b. It is therefore difficult to apply the adhesive to both sides of the workpiece 2 in one step.

SUMMARY

The disclosure provides a method and apparatus for applying a high viscosity material capable of applying a high viscosity material to both front and back surfaces of a workpiece in one step of discharging the high viscosity material from the front surface side of the workpiece.

(1) A first aspect of the disclosure relates to a method for applying a high viscosity material. The method includes discharging the high viscosity material in a form of a continuous thread from an application nozzle toward an end of a workpiece and a space on a side of the workpiece so as to cause the high viscosity material in the form of the thread to adhere to a front surface of the workpiece and to cause the high viscosity material discharged in the form of the thread into the space on the side of the workpiece to pivot around an edge of the workpiece to a back surface of the workpiece and adhere to the back surface of the workpiece.

(2) The high viscosity material may be discharged with the application nozzle moving in a circular motion about an axis of the application nozzle.

(3) The high viscosity material may be discharged with the application nozzle moving in a direction in which the edge of the workpiece extends.

(4) The high viscosity material may be discharged with the end of the workpiece placed below the application nozzle.

(5) The high viscosity material may be discharged from the application nozzle with a diameter of 0.5 mm to 0.7 mm.

(6) The high viscosity material may be a material with a viscosity of 300 Pa·s or higher at a shear velocity of 15 s$^{-1}$.

(7) A second aspect of the disclosure relates to an apparatus for applying a high viscosity material. The apparatus includes an application nozzle configured to discharges the high viscosity material in a form of a continuous thread toward an end of a workpiece and a space on a side of the workpiece.

(8) The application nozzle may discharge the high viscosity material such that, of the high viscosity material, a first high viscosity material portion discharged toward the end of the workpiece adheres to the end of the workpiece and a second high viscosity material portion discharged toward the space on the side of the workpiece pivots around an edge of the workpiece to a back surface of the workpiece and adheres to the back surface of the workpiece.

(9) The application nozzle may discharge the high viscosity material while moving in a circular motion about an axis of the application nozzle.

(10) The application nozzle may discharge the high viscosity material while moving in a direction in which the edge of the workpiece extends.

(11) The application nozzle may be placed above the end of the workpiece.

(12) The application nozzle may have a diameter of 0.5 mm to 0.7 mm.

(13) The high viscosity material may be a material with a viscosity of 300 Pa·s or higher at a shear velocity of 15 s$^{-1}$.

According to the method of (1), the high viscosity material in the form of the thread is caused to adhere to the front surface of the workpiece, and the high viscosity material discharged in the form of the thread into the space on the side of the workpiece is caused to pivot around the edge of the workpiece to the back surface of the workpiece and adhere to the back surface of the workpiece. The high viscosity material can thus be applied to both the front and back surfaces of the workpiece in one step of discharging the high viscosity material only from the front surface side of the workpiece.

According to the method of (2), the high viscosity material is discharged with the application nozzle moving in a circular motion about the axis of the application nozzle. The high viscosity material is thus directed in a helical path toward the workpiece. Accordingly, the high viscosity material can be discharged in the form of the continuous thread toward the end of the front surface of the workpiece and the space on the side of the workpiece.

According to the method of (3), the high viscosity material is discharged with the application nozzle moving in the direction in which the edge of the workpiece extends. The high viscosity material can thus be applied to the front and back surfaces of the workpiece along the edge of the workpiece.

According to the method of (4), the high viscosity material is discharged with the end of the workpiece placed below the application nozzle. The high viscosity material discharged in the form of the thread into the space on the side of the workpiece can thus be caused to pivot around the edge of the workpiece to the back surface of the workpiece using the gravity applied to the high viscosity material discharged in the form of the thread into the space on the side of the workpiece. This configuration reduces a discharge pressure of the application nozzle required to cause the high viscosity material to pivot around the edge of the workpiece to the back surface of the workpiece.

According to the method of (5), the nozzle diameter is 0.5 mm to 0.7 mm. The high viscosity material can therefore be discharged in the form of the continuous thread from the application nozzle.

According to the method of (6), the high viscosity material is a material with a viscosity of 300 Pa·s or higher at a shear velocity of 15 $s^{-1}$. Accordingly, the high viscosity material discharged in the form of the thread into the space on the side of the workpiece is less likely to break when pivoting around the edge of the workpiece toward the back surface of the workpiece. That is, the possibility that the high viscosity material may fail to pivot around the edge to the back surface of the workpiece is reduced.

The apparatus of (7) includes the application nozzle configured to discharge the high viscosity material in the form of the continuous thread toward the end of the workpiece and the space on the side of the workpiece. The high viscosity material discharged in the form of the thread from the application nozzle can thus be caused to adhere to the front surface of the workpiece, and the high viscosity material discharged in the form of the thread from the application nozzle into the space on the side of the workpiece is caused to pivot around the edge of the workpiece to the back surface of the workpiece and adhere to the back surface of the workpiece. The high viscosity material can therefore be applied to both front and back surfaces of the workpiece in one step of discharging the high viscosity material only from the front surface side of the workpiece.

According to the apparatus of (8), the application nozzle discharges the high viscosity material such that, of the high viscosity material, the first high viscosity material portion discharged toward the end of the workpiece adheres to the end of the workpiece and the second high viscosity material portion discharged toward the space on the side of the workpiece pivots around the edge of the workpiece to the back surface of the workpiece and adheres to the back surface of the workpiece. The high viscosity material discharged in the form of the thread from the application nozzle can thus be caused to adhere to the front surface of the workpiece, and the high viscosity material discharged in the form of the thread into the space on the side of the workpiece can be caused to pivot around the edge of the workpiece to the back surface of the workpiece and adhere to the back surface of the workpiece. The high viscosity material can therefore be applied to both front and back surfaces of the workpiece in one step of discharging the high viscosity material only from the front surface side of the workpiece.

According to the apparatus of (9), the application nozzle discharges the high viscosity material while moving in a circular motion about the axis of the application nozzle. The high viscosity material is thus directed in a helical path toward the workpiece. Accordingly, the high viscosity material can be discharged in the form of the continuous thread toward the end of the front surface of the workpiece and the space on the side of the workpiece.

According to the apparatus of (10), the application nozzle discharges the high viscosity material while moving in the direction in which the edge of the workpiece extends. The high viscosity material can thus be applied to the front and back surfaces of the workpiece along the edge of the workpiece.

According to the apparatus of (11), the application nozzle is placed above the end of the workpiece. The high viscosity material discharged in the form of the thread into the space on the side of the workpiece can thus be caused to pivot around the edge of the workpiece to the back surface of the workpiece using the gravity applied to the high viscosity material discharged in the form of the thread into the space on the side of the workpiece. This configuration reduces a discharge pressure of the application nozzle required to cause the high viscosity material to pivot around the edge of the workpiece to the back surface of the workpiece.

According to the apparatus of (12), the nozzle diameter is 0.5 mm to 0.7 mm. The high viscosity material can therefore be discharged in the form of the continuous thread from the application nozzle.

According to the apparatus of (13), the high viscosity material is a material with a viscosity of 300 Pa·s or higher at a shear velocity of 15 $s^{-1}$. Accordingly, the high viscosity material discharged in the form of the thread into the space on the side of the workpiece is less likely to break when pivoting around the edge of the workpiece toward the back surface of the workpiece. That is, the possibility that the high viscosity material may fail to pivot around the edge to the back surface of the workpiece is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
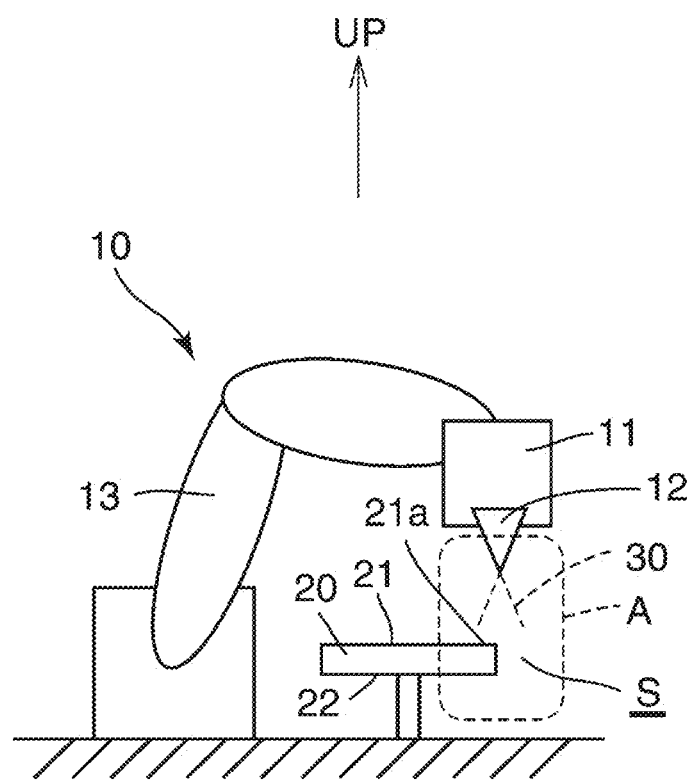
FIG. 1 is a schematic side view of an apparatus for applying a high viscosity material according to an embodiment of the disclosure.

A method and apparatus for applying a high viscosity material according to an embodiment of the disclosure will be described with reference to the accompanying drawings. In the drawings, UP indicates the upward direction.

First, an application apparatus 10 for applying a high viscosity material according to an embodiment of the disclosure will be described.

As shown in FIG. 1, the application apparatus 10 is an apparatus for applying a high viscosity material 30 to a workpiece 20. The application apparatus 10 has an application nozzle 12 attached to an application machine 11. The application machine 11 is attached to a robot 13. The application nozzle 12 is placed above an end 21a of a front surface 21 (upper surface, surface facing the application nozzle 12) of the workpiece 20. The application nozzle 12 discharges the high viscosity material 30 only from the front surface 21 side (from one side) of the workpiece 20 out of the front surface 21 side and the back surface 22 side of the workpiece 20.

The diameter of the application nozzle 12 (the diameter of the discharge opening for discharging the high viscosity material 30) is 0.5 mm to 0.7 mm. The nozzle diameter is not limited to 0.5 mm to 0.7 mm and may be appropriately adjusted according to the viscosity of the high viscosity material 30. The application nozzle 12 can continuously discharge the high viscosity material 30. The application nozzle 12 can therefore discharge the high viscosity material 30 in the form of a continuous thread.

Figure 2:
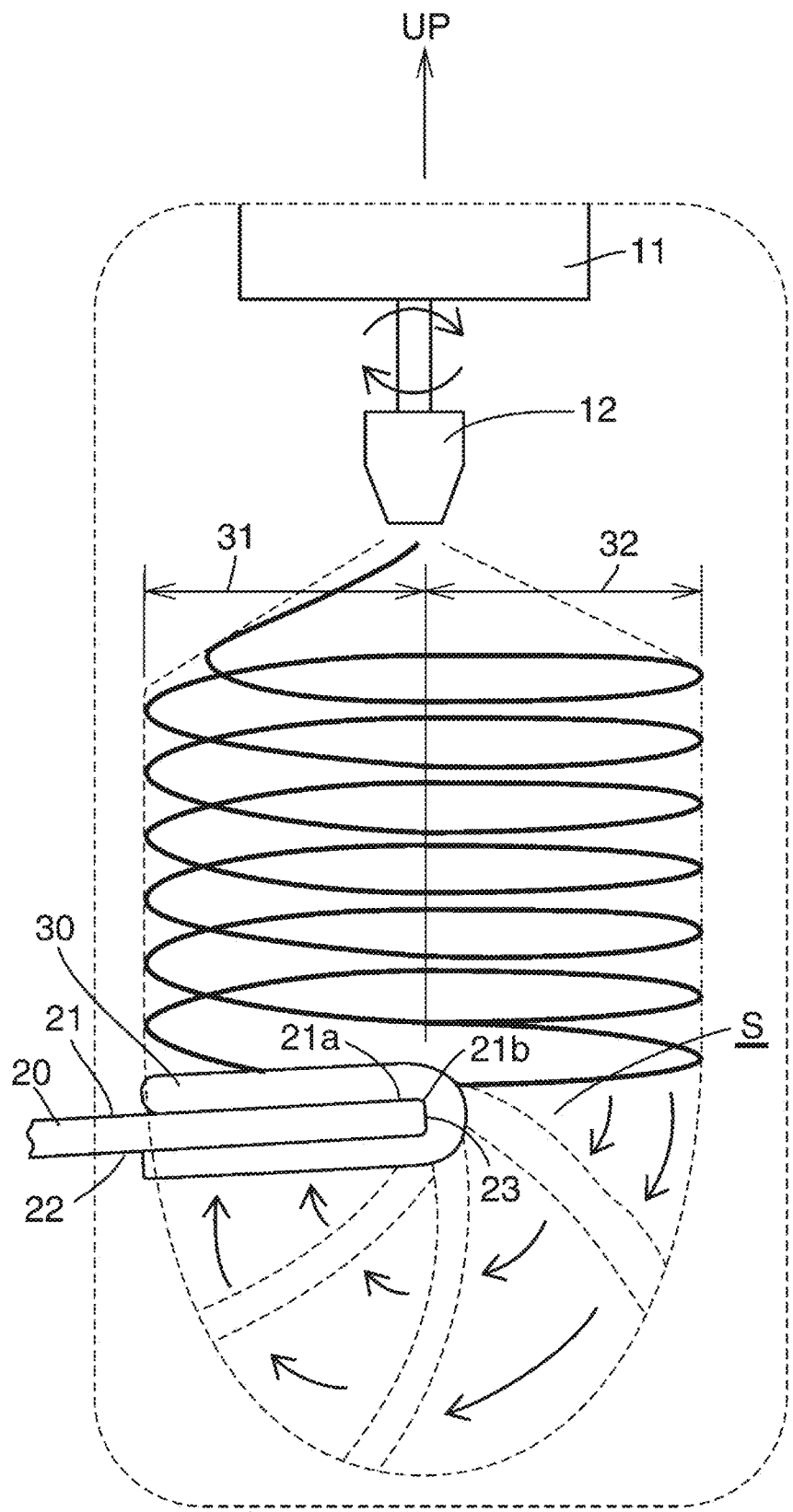
FIG. 2 is an enlarged side view of a portion A in FIG. 1.

As shown in FIG. 2, the application nozzle 12 can move in a circular motion about its axis. The application nozzle 12 discharges the high viscosity material 30 while moving in a circular motion. The high viscosity material 30 is therefore directed along a helical (swirling) path toward the workpiece 20.

The application nozzle 12 discharges the high viscosity material 30 so that a part of the discharged high viscosity material 30 is directed toward the end 21a of the front surface 21 of the workpiece 20 and the rest of the discharged high viscosity material 30 is directed toward a space S on the side of the workpiece 20. The application nozzle 12 discharges the high viscosity material 30 so that a high viscosity material portion 31 discharged toward the end 21a of the front surface 21 of the workpiece 20 adheres to the end 21a of the front surface 21 of the workpiece 20 and a high viscosity material portion 32 discharged toward the space S on the side of the workpiece 20 pivots around an edge 21b of the front surface 21 of the workpiece 20 to the back surface 22 of the workpiece 20 and adheres to the back surface 22 of the workpiece 20.

Each of the high viscosity material portion 31 discharged from the application nozzle 12 toward the end 21a of the workpiece 20 and the high viscosity material portion 32 discharged from the application nozzle 12 toward the space S on the side of the workpiece 20 is subjected to the discharge pressure and the gravity in the vertically downward direction. When the high viscosity material portion 31 adheres to the end 21a of the front surface 21 of the workpiece 20, a moment is applied to the high viscosity material portion 32 discharged toward the space S. The high viscosity material portion 32 therefore pivots around the edge 21b of the workpiece 20 to the back side of the workpiece 20 and adheres to the back surface 22 of the workpiece 20. As a result, the high viscosity material 30 is applied to the front surface 21 and the back surface 22 of the workpiece 20 and an end face 23 of the workpiece 20 connecting the front surface 21 and the back surface 22 of the workpiece 20.

Figure 3:
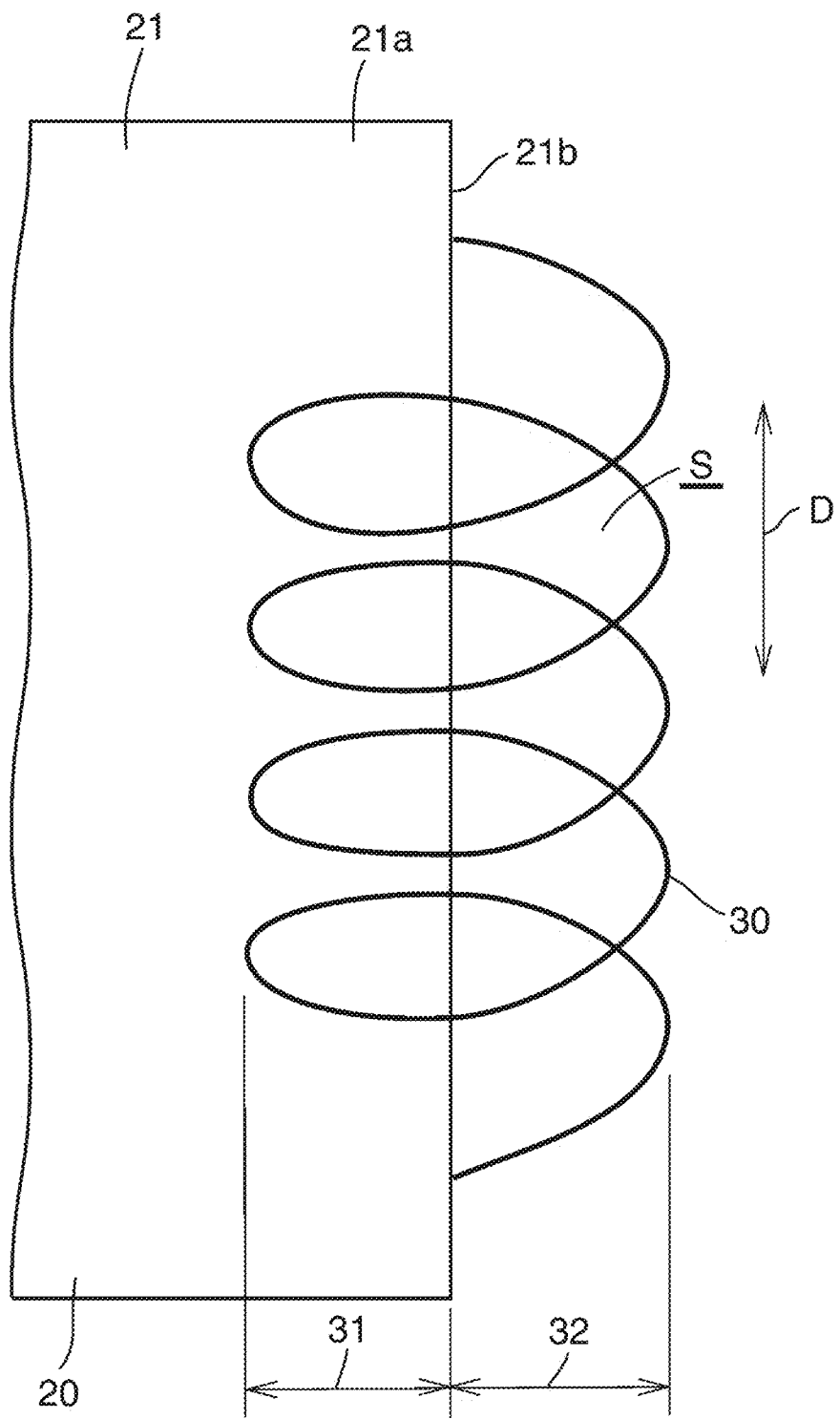
FIG. 3 is an enlarged plan view of the portion A in FIG. 1.
Figure 4:
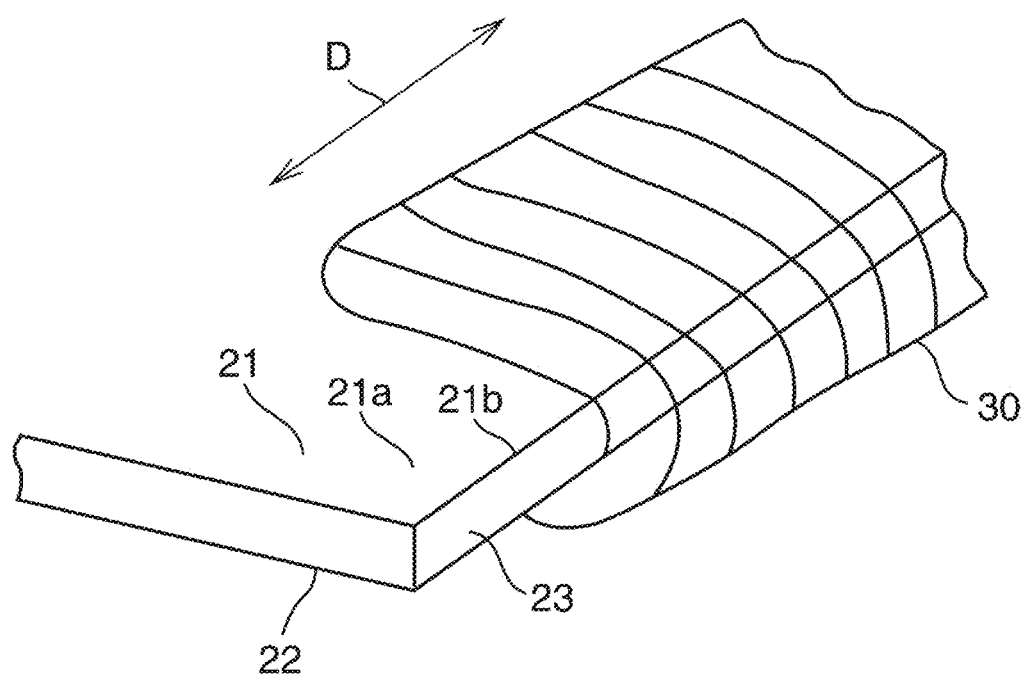
FIG. 4 is a schematic enlarged perspective view of the high viscosity material applied to a workpiece by a method for applying a high viscosity material, which is performed using the apparatus shown in FIG. 1.

As shown in FIG. 3, the application nozzle 12 discharges the high viscosity material 30 while moving in the direction D in which the edge 21b of the workpiece 20 extends. The high viscosity material 30 is thus applied to the front surface 21 and the back surface 22 along the edge 21b of the workpiece 20. The movement of the application nozzle 12 is caused by moving the robot 13. FIG. 3 shows the high viscosity material 30 discharged from the application nozzle 12 moving in the direction D.

The high viscosity material 30 is an adhesive made of a thermosetting resin. The high viscosity material 30 may be a two-component thermosetting epoxy structural adhesive, but is desirably a one-component thermosetting epoxy structural adhesive. In the case of the one-component epoxy resin, curing of the adhesive can be suppressed until it is heated, and the application nozzle 12 can relatively easily discharge the high viscosity material 30 in the form of a continuous thread.

The high viscosity material 30 is a material with a viscosity of 300 Pa·s or higher at a shear velocity of 15 s$^{-1}$. If the viscosity is low, the high viscosity material 30 may break when pivoting around the edge 21b toward the back surface 22 of the workpiece 20. That is, the high viscosity material 30 may fail to pivot around the edge 21b to the back surface 22 of the workpiece 20 and fail to adhere to the back surface 22 of the workpiece 20. If the high viscosity material 30 is a material with a viscosity of 300 Pa·s or higher at a shear velocity of 15 s$^{-1}$, the high viscosity material 30 with a higher viscosity satisfactorily pivots around the edge 21b to the back surface 22 of the workpiece 20.

Next, an application method using the application apparatus 10 will be described. The method for applying a high viscosity material according to the embodiment of the disclosure includes the following steps in this order:

(i) placing the workpiece 20 and the application nozzle 12 so that the end 21a of the front surface 21 of the workpiece 20 is located below the application nozzle 12, and (ii) discharging the high viscosity material 30 in the form of a continuous thread from the application nozzle 12 toward the end 21a of the front surface 21 of the workpiece 20 and the space S on the side of the workpiece 20 so as to cause the high viscosity material 30 discharged in the form of the thread to adhere to the front surface 21 of the workpiece 20 and to cause the high viscosity material portion 32 discharged in the form of the thread into the space S on the side of the workpiece 20 to pivot around the edge 21b of the workpiece 20 to the back surface 22 of the workpiece 20 and adhere to the back surface 22 of the workpiece 20.

Regarding Step (i)

In step (i), as shown in FIG. 2, the workpiece 20 and the application nozzle 12 are placed so that the edge 21b of the end 21a of the workpiece 20 is located vertically below the application nozzle 12. With this configuration, when the high viscosity material 30 discharged from the application nozzle 12 is directed along a helical path toward the workpiece 20, a part of the discharged high viscosity material 30 is directed toward the end 21a of the front surface 21 of the workpiece 20 and the rest of the discharged high viscosity material 30 is directed toward the space S on the side of the workpiece 20.

Regarding Step (ii)

(ii-1) The high viscosity material 30 is discharged from the application nozzle 12 while moving the application nozzle 12 in a circular motion. The high viscosity material 30 discharged from the application nozzle 12 is thus directed along a helical path toward the workpiece 20.

(ii-2) The high viscosity material 30 is discharged from the application nozzle 12 while moving the application nozzle 12 in the direction D in which the edge 21b of the workpiece 20 extends. The high viscosity material 30 is thus applied along the edge 21b of the workpiece 20.

(ii-3) The high viscosity material 30 is discharged in the form of a continuous thread from the application nozzle 12 with a diameter of 0.5 mm to 0.7 mm. The nozzle diameter is not limited to 0.5 mm to 0.7 mm and may be appropriately adjusted according to the viscosity of the high viscosity material 30. Since the high viscosity material 30 is discharged in a continuous form, the high viscosity material 30 is uniformly applied to the workpiece 20. Since the high viscosity material 30 is discharged in the form of a thread, the mass per unit length of the high viscosity material portion 32 discharged toward the space S on the side of the workpiece 20 will not become too large, and the high viscosity material portion 32 is therefore less likely to break when pivoting around the edge 21b toward the back surface 22 of the workpiece 20.

(ii-4) The application nozzle 12 discharges the high viscosity material 30 only from the front surface 21 side of the workpiece 20 out of the front surface 21 side and the back surface 22 side of the workpiece 20. That is, in the application method of the embodiment of the disclosure, neither the application nozzle 12 is moved to the back surface 22 side of the workpiece 20 nor the workpiece 20 is turned over.

The method and apparatus for applying the high viscosity material 30 to the workpiece 20 have the following functions and effects.

(A) The high viscosity material 30 is caused to adhere to the front surface 21 of the workpiece 20, and the high viscosity material portion 32 discharged in the form of a thread into the space S on the side of the workpiece 20 is caused to pivot around the edge 21b to the back surface 22 of the workpiece 20 and adhere to the back surface 22 of the workpiece 20. The high viscosity material 30 can thus be applied to both the front surface 21 and the back surface 22 of the workpiece 20 in one step of discharging the high viscosity material 30 only from the front surface 21 side of the workpiece 20.

(B) Since the high viscosity material 30 is discharged from the application nozzle 12 while moving the application nozzle 12 in a circular motion about the axis of the application nozzle 12, the high viscosity material 30 is directed along a helical path toward the workpiece 20. The high viscosity material 30 can thus be discharged in the form of a continuous thread toward the end 21a of the front surface 21 of the workpiece 20 and the space S on the side of the workpiece 20.

(C) The high viscosity material 30 is discharged from the application nozzle 12 while moving the application nozzle 12 in the direction in which the edge 21b of the workpiece 20 extends. The high viscosity material 30 can thus be applied to the front surface 21 and the back surface 22 of the workpiece 20 along the edge 21b of the workpiece 20.

(D) Since the high viscosity material 30 is discharged from the application nozzle 12 with the end 21a of the workpiece 20 placed below the application nozzle 12, the high viscosity material portion 32 discharged in the form of a thread into the space S on the side of the workpiece 20 can be caused to pivot around the edge 21b to the back surface 22 of the workpiece 20 using the gravity applied to the high viscosity material portion 32 discharged into the space S on the side of the workpiece 20. This configuration reduces the discharge pressure of the application nozzle 12 required to cause the high viscosity material portion 32 to pivot around the edge 21b to the back surface 22 of the workpiece 20.

(E) Since the nozzle diameter is 0.5 mm to 0.7 mm, the high viscosity material 30 can be discharged in the form of a continuous thread from the application nozzle 12.

(F) Since the high viscosity material 30 is a material with a viscosity of 300 Pa·s or higher at a shear velocity of 15 s$^{-1}$, the high viscosity material portion 32 discharged into the space S on the side of the workpiece 20 is less likely to break when pivoting around the edge 21b of the workpiece 20 toward the back surface 22 of the workpiece 20. That is, the possibility that the high viscosity material 30 may fail to pivot around the edge 21b to the back surface 22 of the workpiece 20 is reduced.

Figure 6:
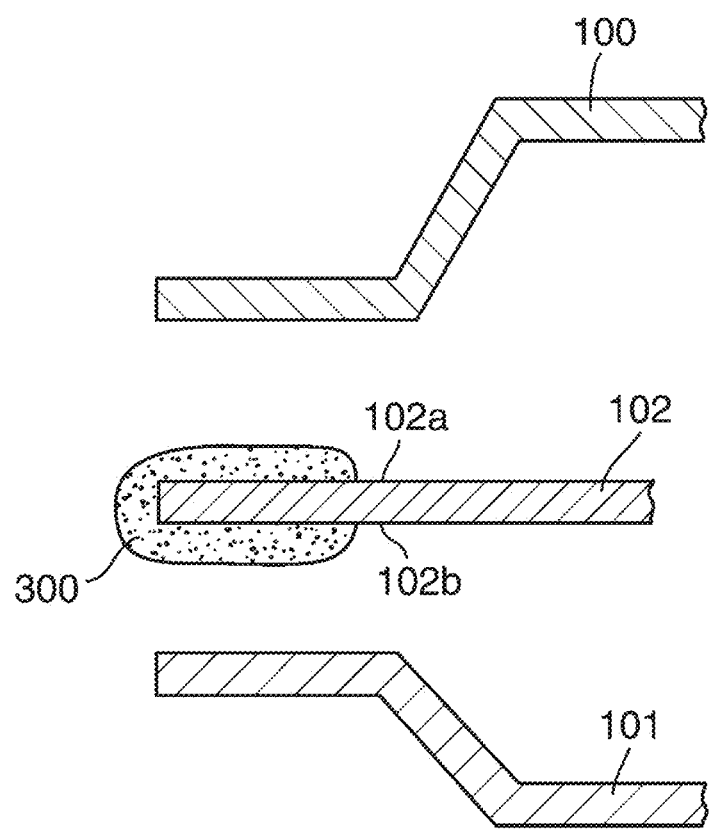
FIG. 6 is a schematic section illustrating a first example of the effects of the method and apparatus for applying a high viscosity material according to the embodiment of the disclosure.
Figure 7:
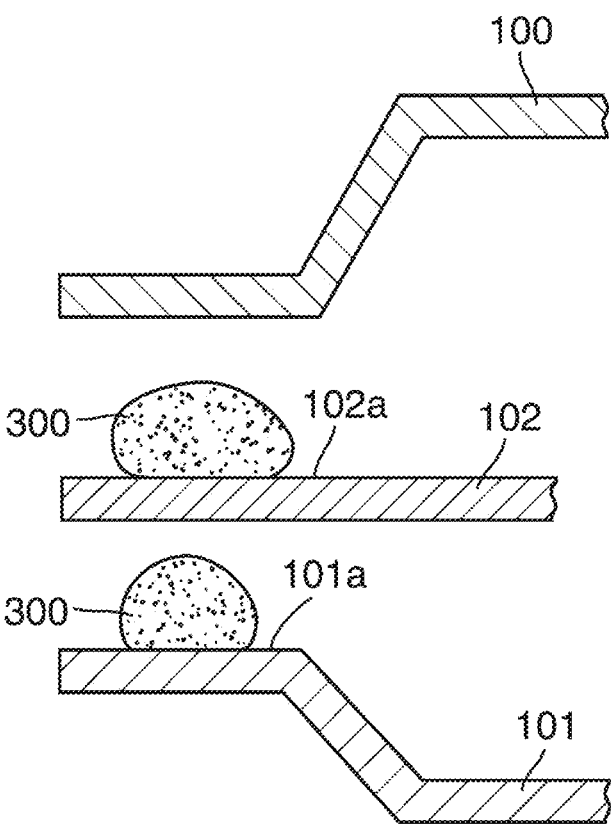
FIG. 7 is a schematic section illustrating a comparative example (not an embodiment of the disclosure) of the first example of the effects shown in FIG. 6.

(G) Since the high viscosity material 30 can be applied to both the front surface 21 and the back surface 22 of the workpiece 20 in one step of discharging the high viscosity material 30 only from the front surface 21 side of the workpiece 20, the following effect is achieved. FIG. 7 shows a comparative example of the disclosure. In the comparative example, when bonding a side frame reinforcement plate 102, which is a member placed between an outer side frame 100 and an inner side frame 101 of a vehicle body, to both the outer side frame 100 and the inner side frame 101, an adhesive 300 is applied to one side surface 102a of the side frame reinforcement plate 102 in one step, and the adhesive 300 is applied to one side surface 101a of the inner side frame 101 in another step. That is, it takes two steps to apply the adhesive 300. On the other hand, by using the application method and the application apparatus of the embodiment of the disclosure, the adhesive 300, which is a high viscosity material, can be applied to both surfaces 102a, 102b of the side frame reinforcement plate 102 in one step, as shown in FIG. 6. The number of steps it takes to apply the adhesive 300 can thus be reduced to one.

(H) Since the high viscosity material portion 32 pivots around the edge 21b to the back side of the workpiece 20 and adheres to the back surface 22 of the workpiece 20, the high viscosity material 30 can be applied to the front surface 21 and the back surface 22 of the workpiece 20 and the end face 23 of the workpiece 20 connecting the front surface 21 and the back surface 22. The following effects (H1) and (H2) are thus achieved.

Figure 8:
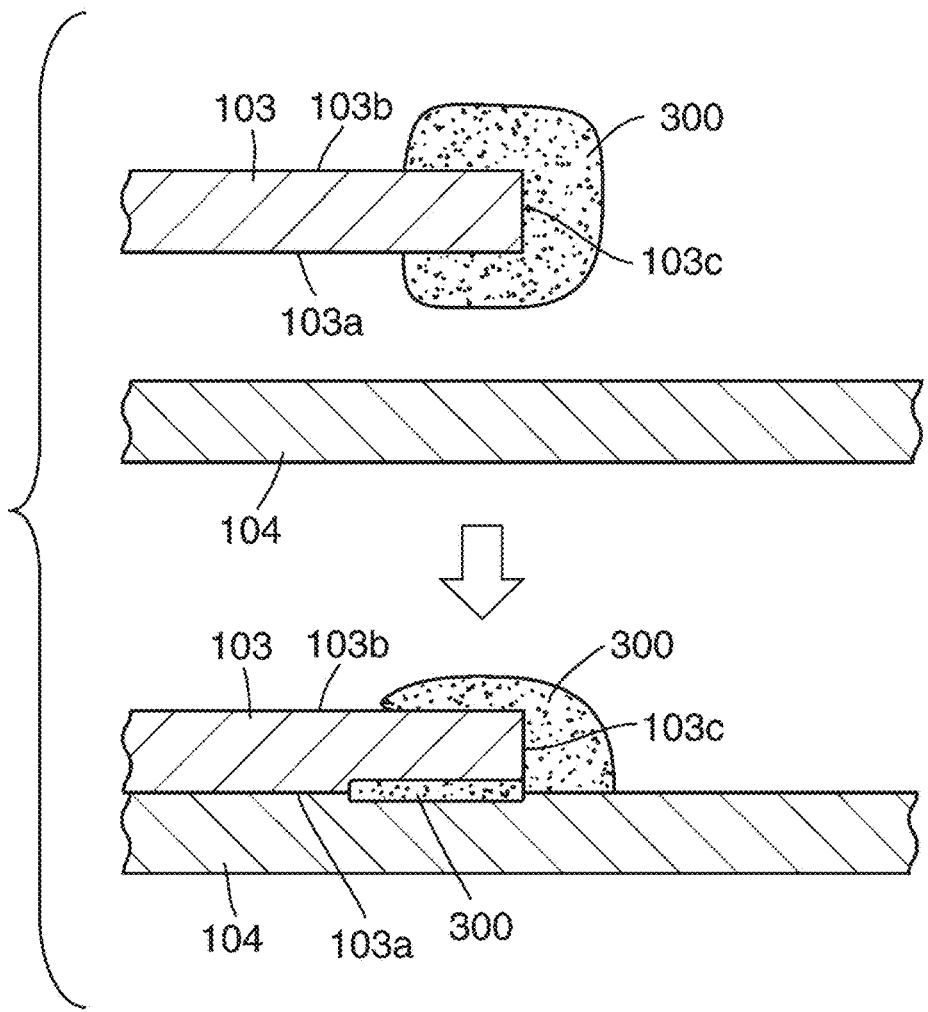
FIG. 8 is a schematic section illustrating a second example of the effects of the method and apparatus for applying a high viscosity material according to the embodiment of the disclosure.
Figure 9:
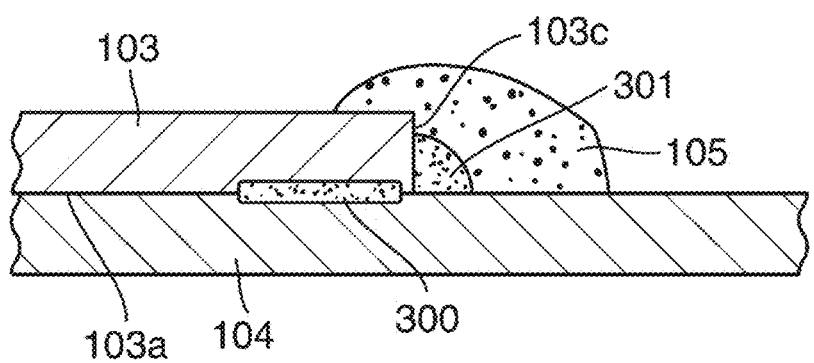
FIG. 9 is schematic section illustrating a comparative example (not an embodiment of the disclosure) of the second example of the effects shown in FIG. 8.

(H1) FIG. 9 shows a comparative example of the disclosure. In the comparative example, when bonding only one side surface 103a of a first adherend 103 to a second adherend 104, the adhesive 300 is applied only to the side surface 103a of the first adherend 103 to bond the first adherend 103 and the second adherend 104. The adhesive 300 is therefore present between the first adherend 103 and the second adherend 104, and an excess adhesive portion 301 that comes out from between the first adherend 103 and the second adherend 104 covers at least a part of an end face 103c of the first adherend 103. However, the adhesive portion 301 does not always completely cover the entire end face 103c of the first adherend 103. It is therefore necessary to apply a sealant 105 in a painting process in order to reduce corrosion that starts from the end face 103c. On the other hand, by using the application method and the application apparatus of the embodiment of the disclosure, the adhesive 300, which is a high viscosity material, can be applied to both surfaces 103a, 103b and the end face 103c of the first adherend 103, as shown in FIG. 8. Accordingly, not only the adhesive 300 is present between the first adherend 103 and the second adherend 104, but also the adhesive 300 reliably covers the end face 103c of the first adherend 103. There is therefore no need to apply the sealant 105 (FIG. 9) for reducing corrosion that starts from the end face 103c of the first adherend 103.

Figure 10:
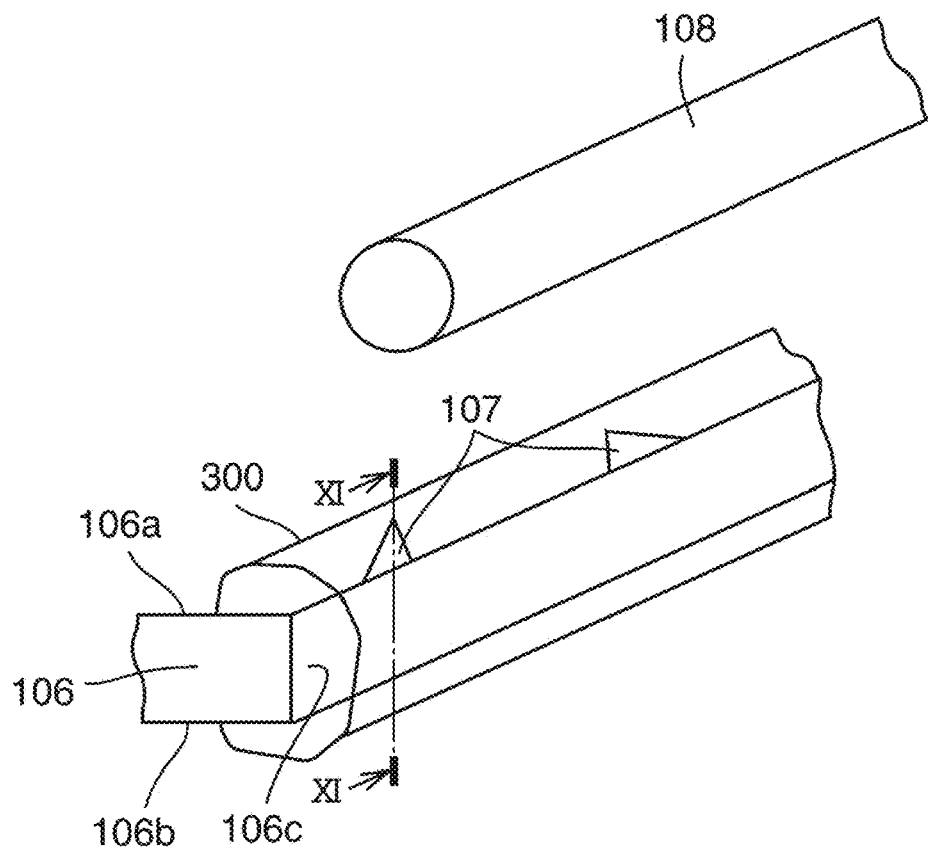
FIG. 10 is a schematic perspective view illustrating a third example of the effects of the method and apparatus of applying a high viscosity material according to the embodiment of the disclosure.
Figure 11:
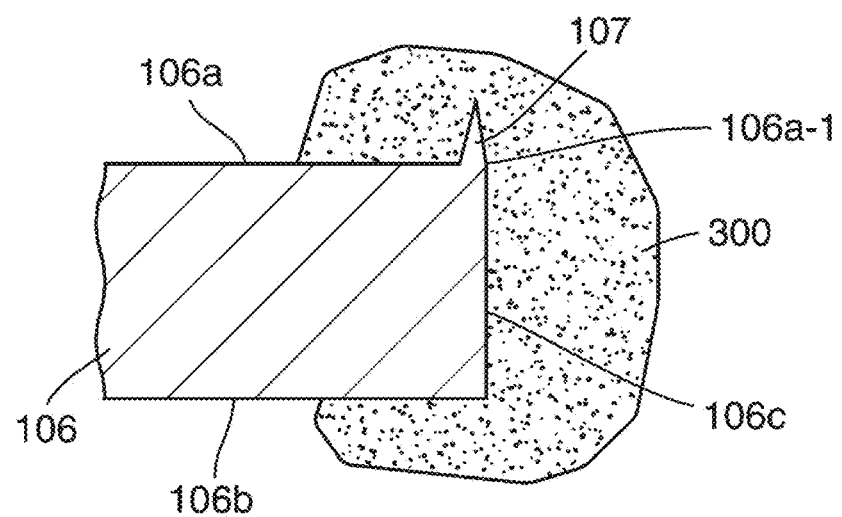
FIG. 11 is an enlarged section taken along the line XI-XI in FIG. 10.
Figure 12:
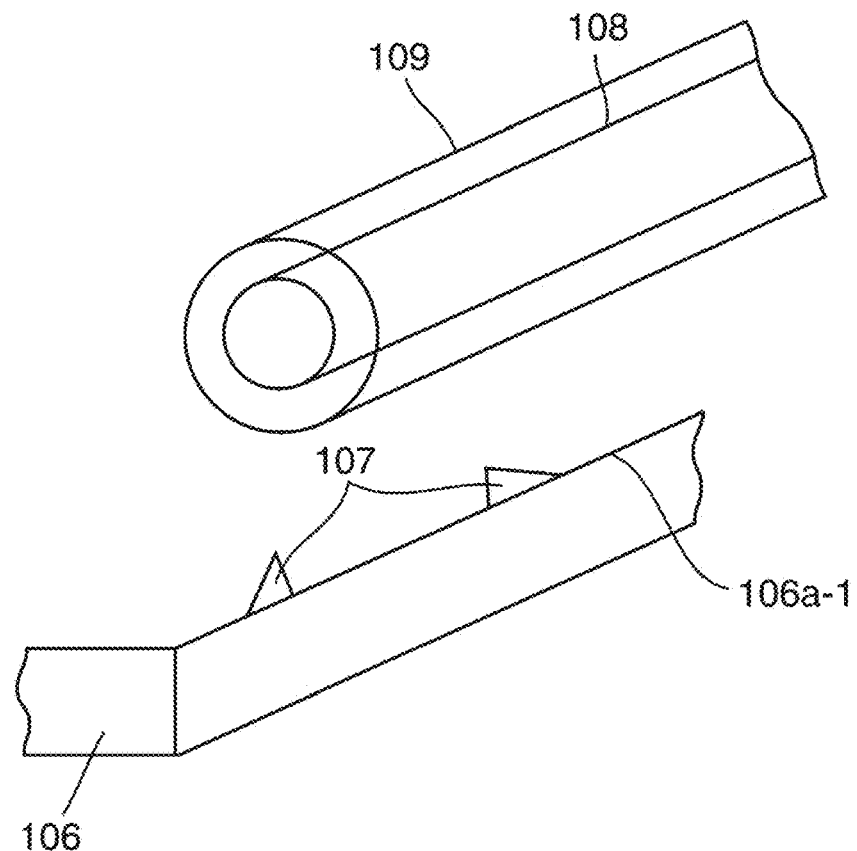
FIG. 12 is a schematic perspective view illustrating a comparative example (not an embodiment of the disclosure) of the third example of the effects shown in FIGS. 10 and 11.
Figure 13:
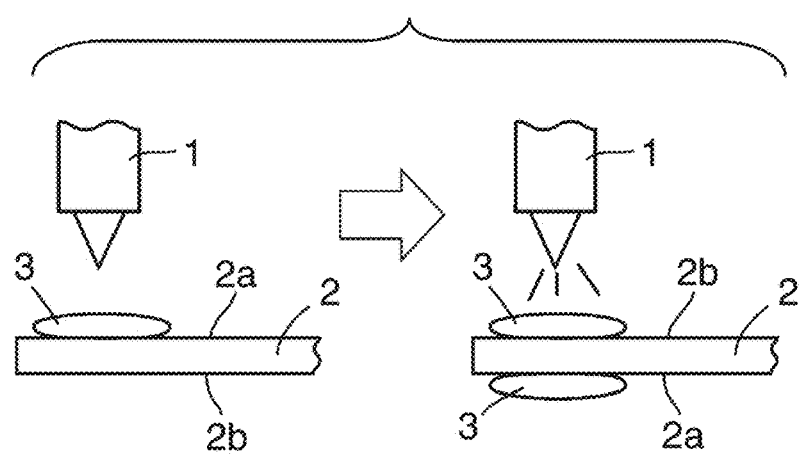
FIG. 13 schematically illustrates a conventional method for applying an adhesive to both front and back surfaces of a workpiece.
Figure 14:
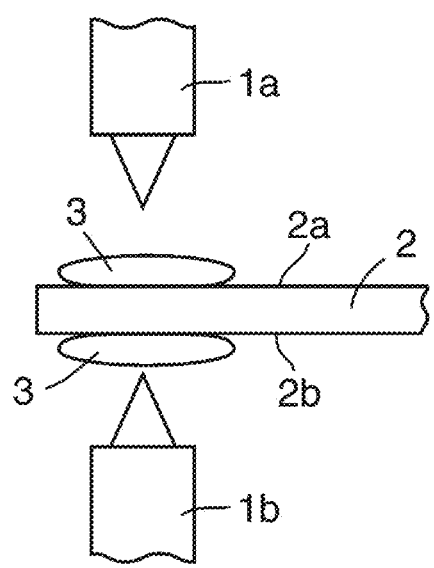
FIG. 14 schematically illustrates a conventional method for applying an adhesive to both front and back surfaces of a workpiece.
Figure 15:
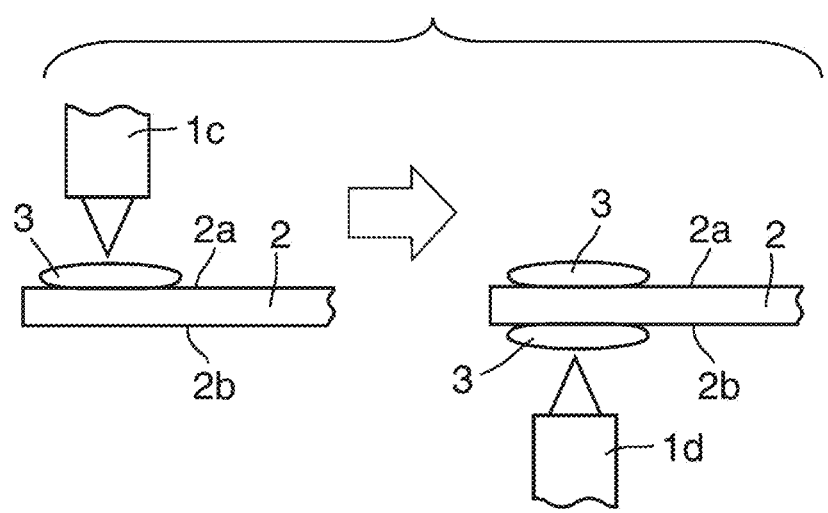
FIG. 15 schematically illustrates a conventional method for applying an adhesive to both front and back surfaces of a workpiece.

(H2) FIG. 12 shows a comparative example (as of present) of the disclosure. Burrs 107 are sometimes formed on an edge 106a-1 of an iron sheet 106. In the comparative example, it is therefore necessary to wrap a wire harness 108 with a protective material 109 in order to reduce damage to the wire harness 108 running near the iron sheet 106 from the burrs 107. On the other hand, by using the application method and the application apparatus of the embodiment of the disclosure, the adhesive 300, which is a high viscosity material, can be applied to both surfaces 106a, 106b and an end face 106c of the iron sheet 106, as shown in FIGS. 10 and 11. The burrs 107 of the iron sheet 106 can thus be covered with the adhesive 300. The protective material 109 (FIG. 12) for protecting the wire harness 108 from the burrs 107 is therefore not necessary.

Evaluation was carried out on the high viscosity material 30 applied to both sides of the workpiece 20 using the application apparatus 10.

Viscosity Evaluation

One-component thermosetting epoxy structural adhesives were used as the high viscosity material 30. One-component thermosetting epoxy structural adhesives with viscosities of 100 Pa·s, 300 Pa·s, and 500 Pa·s at a shear velocity of 15 s$^{-1}$ at room temperature (15° C. or higher and 25° C. or lower) were applied to the back surfaces 22 of the workpieces 20, and the applied adhesives were examined.

Figure 5:
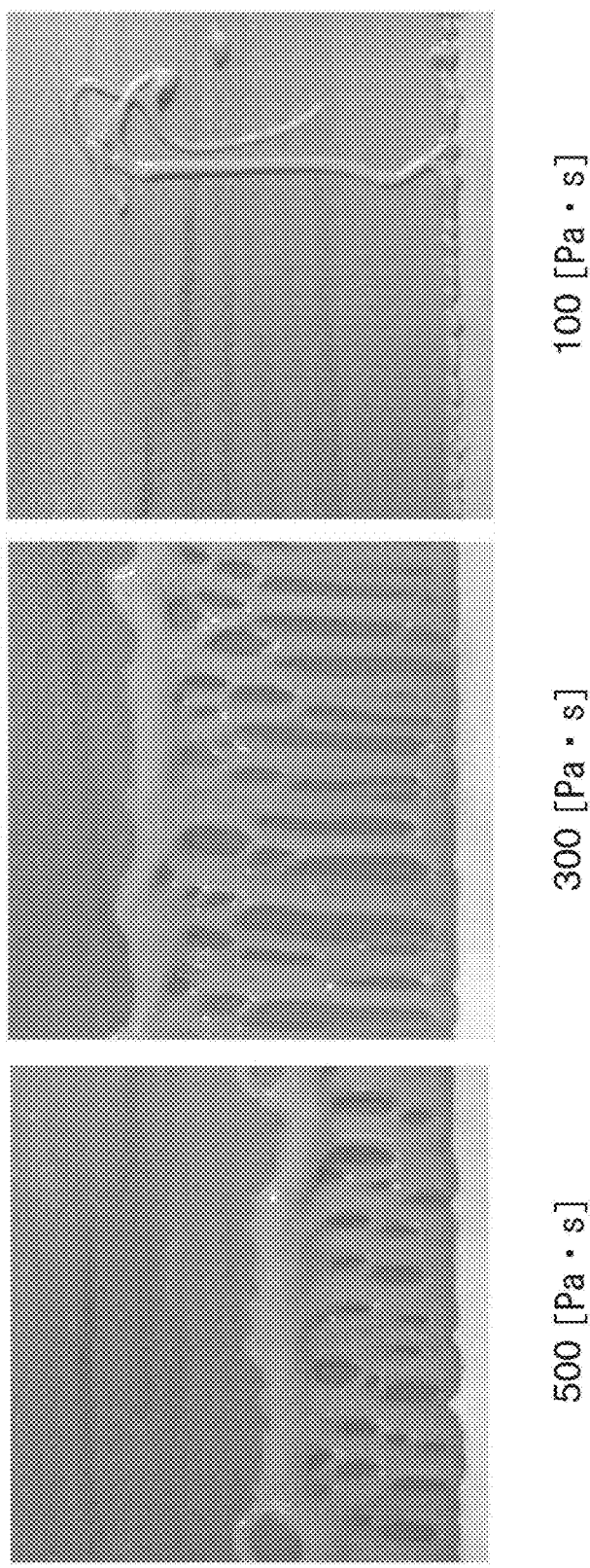
FIG. 5 shows images of high viscosity materials with different viscosities applied to the back surfaces of workpieces using the method and apparatus for applying a high viscosity material according to the embodiment of the disclosure.

The results are shown in Table 1. FIG. 5 shows images of the adhesives applied to the back surface 22 of the workpiece 20.

TABLE 1

| Viscosity (Pa · s) Shear Velocity 15 (s$^{-1}$) | Application Quality |
|---|---|
| 500 | Good |
| 300 | Good |
| 100 | Poor |

The results of Table 1 and FIG. 5 show that the adhesives with higher viscosities satisfactorily pivot around the edge 21b to the back surface 22 of the workpiece 20 and that as the viscosity decreases, the adhesive stretches to a greater extent when adhering to the back surface 22 of the workpiece 20. The results of Table 1 and FIG. 5 also show that the adhesive with a viscosity of 100 Pa·s breaks without pivoting around the edge 21b to the back surface 22 of the workpiece 20. It was found from the above results that when a one-component thermosetting epoxy structural adhesive is used as the high viscosity material 30, it is desirable that the high viscosity material 30 have a viscosity of 300 Pa·s or higher at a shear velocity of 15 s$^{-1}$ at room temperature (15° C. or higher and 25° C. or lower).

Evaluation of Nozzle Diameter and Flow Rate

One-component thermosetting epoxy structural adhesives with viscosities of 300 Pa·s or higher at a shear velocity of 15 s$^{-1}$ at room temperature (15° C. or higher and 25° C. or lower) were used as the high viscosity material 30. These adhesives were applied to the workpieces 20 using the application nozzles 12 with different diameters (mm) at different flow rates (cc/sec). The results are shown in FIG. 2.

TABLE 2

| Flow Rate (cc/sec) | | | | |
|---|---|---|---|---|
| 1.6 | No | Yes | Yes | No |
| 1.4 | No | Yes | Yes | No |
| 1.2 | Yes | Yes | Yes | No |
| 1.0 | Yes | Yes | No | No |
| | 0.5 | 0.6 | 0.7 | 1.0 |
| | Nozzle Diameter (mm) | | | |

The following was found from the results in Table 2.

(a) With the nozzle diameter of 0.6 mm, the adhesive was able to be applied to both sides of the workpiece 20 without breaking at all of the discharge flow rates of 1.0 cc/sec, 1.2 cc/sec, 1.4 cc/sec, and 1.6 cc/sec.

(b) With the nozzle diameter of 0.5 mm, the adhesive was able to be applied to both sides of the workpiece 20 without breaking at the discharge flow rates of 1.0 cc/sec and 1.2 cc/sec, but the adhesive failed to be applied to both sides of the workpiece 20 without breaking at the discharge flow rates of 1.4 cc/sec and 1.6 cc/sec.

(c) With the nozzle diameter of 0.7 mm, the adhesive was able to be applied to both sides of the workpiece 20 without breaking at the discharge flow rates of 1.2 cc/sec, 1.4 cc/sec, and 1.6 cc/sec, but the adhesive failed to be applied to both sides of the workpiece 20 without breaking at the discharge flow rate of 1.0 cc/sec.

(d) With the nozzle diameter of 1.0 mm, the adhesive failed to be applied to both sides of the workpiece 20 without breaking at all of the discharge flow rates of 1.0 cc/sec, 1.2 cc/sec, 1.4 cc/sec, and 1.6 cc/sec.

(e) It was found from the above results that when a one-component thermosetting epoxy structural adhesive is used as the high viscosity material 30, the nozzle diameter is desirably 0.6 mm, and the nozzle diameter of 0.5 mm or 0.7 mm is acceptable depending on the flow rate.

What is claimed is:

1. A method for applying a material, the method comprising:
    moving an application nozzle in a circular motion about an axis of the application nozzle, wherein the application nozzle is positioned above a front surface of a workpiece; and
    while moving the application nozzle in the circular motion above the front surface, discharging the material in a form of a continuous thread from the application nozzle toward an end of the workpiece and a space on a side of the workpiece so as to cause a portion of the material in the form of the thread to adhere to the front surface of the workpiece and to cause another portion of the material discharged in the form of the thread into the space on the side of the workpiece to pivot around an edge of the workpiece to a back surface of the workpiece and adhere to the back surface of the workpiece.

2. The method according to claim 1, wherein the material is discharged with the application nozzle moving in a direction in which the edge of the workpiece extends.

3. The method according to claim 1, wherein the material is discharged with the end of the workpiece placed below the application nozzle.

4. The method according to claim 1, wherein the material is discharged from the application nozzle with a diameter of 0.5 mm to 0.7 mm.

5. The method according to claim 1, wherein the material has a viscosity of 300 Pa·s or higher at a shear velocity of 15 s$^{-1}$.

* * * * *